United States Patent Office 3,752,701
Patented Aug. 14, 1973

3,752,701
GLASS FOR COATING SEMICONDUCTORS, AND SEMICONDUCTOR COATED THEREWITH
William J. Morrissey, Chelmsford, Mass., assignor to General Instrument Corporation, Newark, N.J.
No Drawing. Filed July 27, 1970, Ser. No. 58,710
Int. Cl. C03c 3/04, 3/08
U.S. Cl. 117—201                     8 Claims

ABSTRACT OF THE DISCLOSURE

An alkali-free zinc-borosilicate glass containing small amounts of lead and aluminum oxide constitutes an excellent passivating and protecting coating for semiconductors.

---

The present invention relates to a glass composition particularly well adapted for the coating of semiconductor devices, and particularly silicon semiconductor devices, for passivation and protection purposes.

It has long been known that semiconductor devices are more reliable and longer lived if their active surfaces are provided with a passivating and protecting coating. Many different substances have been proposed for use as such a coating. Among such coating compositions previously proposed are various types of glasses. The obvious advantages of glasses as coatings for semiconductors have led to considerable experimentation, but prior to the instant invention that line of experimentation, although producing some glass compositions which have been commercially accepted, has fallen far short of producing what might be considered as an optimum type of glass coating. In addition to glasses, the prior art suggested materials such as plastics and resins. In the glass area, the prior art has suggested selenium-arsenic-sulphur compositions, and high melting point borosilicate glasses of the Pyrex type. These glass compositions have the advantage that they can be deposited on semiconductor bodies such as chips of silicon by known methods such as sputtering, centrifuging, and thermal evaporation. They have the further advantage of producing a dense, relatively homogeneous and relatively impermeable coating which would be expected to provide an appreciable degree of protection and passivation to the underlying semiconductor unit.

However, these glasses of the prior art have suffered from one or more of the following disadvantages: (1) Lack of chemical durability, (2) a coefficient of thermal expansion which does not match that of the underlying semiconductor body, (3) their electrical properties such as resistivity, dielectric strength and ionic mobility are inferior, (4) excessively high firing temperatures must be used in their manufacture, (5) the glasses contain active impurities which migrate to the semiconductor body and adversely affect the semiconductor-functioning of that body, and (6) the softening point of the glasses is excessively high.

If the glass does not have proper chemical durability, it will be adversely affected by the various processing agents used in semiconductor manufacture, and consequently will not itself stand up or else will dissociate and act as an affrmative agent of attack on the underlying semiconductor body. It the coefficient of thermal expansion of the glass does not closely match that of the underlying semiconductor base, temperature changes to which the device is subjected will either cause cracking of the glass coating or will cause that coating to separate from the underlying base, or both. If the glass does not have an adequate value of resistivity or dielectric strength it will not properly function as an insulator or protector for the semiconductor. If the ionic mobility within the glass is too high, ions in the glass can migrate from the glass to the semiconductor body, and such ions may well adversely affect the operation of the semiconductor. Indeed, such highly mobile ions as lithium, sodium or potassium, the alkali ions, usually present in glass, act as a poison to the semiconductor, leading to grave deterioration in the semiconductor device and the production of serious electrical problems therein. If the glasses used require excessively high firing temperatures, they are to difficult and expensive to prepare. If the glasses contain active impurities which are injurious to the semiconductor, they will not adequately perform their protective functions. If the glasses have an excessively high softening point they will have to be applied to the semiconductor bodies at that excessively high temperature, thereby possibly causing damage to or deterioration of the semiconductor body during the process of cooling application.

Because of these considerations the art has not yet, prior to the present invention, been able to produce a glass composition truly suitable for the surface coating of semiconductor devices such as transistors, rectifiers and diodes, and particularly those having silicon bases.

The primary object of the present invention is to provide a glass of novel composition which is exceptionally well suited for the coating of semiconductor bodies, and which avoids in substantial part all of the disadvantages above set forth which have characterized the prior art glass coatings.

It has long been known that the presence in glasses of lithium, sodium and potassium ions, the so-called alkali ions, is undesirable, and various compositions have been suggested for use in connection with the coating on semiconductors where such ions were presumably not present, that is to say, where the constituents of any significant magnitude did not include any alkali ions. However, this alone has not proved to be sufficient to avoid the problems characteristic of the presence of these alkali ions on or in semiconductors, since the presence of such ions even in trace impurity amounts has been found to produce significant deleterious effects. Consequently more is required than merely having a supposedly alkali-free glass. The trace amounts of alkali ions present in glasses which are nominally alkali free are sufficient to cause serious effects on the underlying semiconductor bases. The glass of the present invention is indeed an alkali-free glass, but in addition it is so constituted as to very substantially inhibit the migration of ions, including alkali ions present only in trace amounts. As a result, even though there may be some alkali ions present in the glass composition, not through design but because it is virtually impossible to completely free the glass composition of such ions, those alkali ions which are present do not have any appreciable deleterious effects on the underlying semiconductor body because for all practical purposes they are not permitted to travel or migrate from the glass to the semiconductor body.

To these end sthe glass of the present invention is what may be generally characterized as a zinc borosilicate glass, that it to say, a borosilicate glass containing a substantial proportion of zinc. To this basic type of glass is added small amounts of lead and aluminum (usually present in the form of oxides). The overall composition is readily applied to the semiconductors under conditions which are acceptable from the point of view of semiconductor fabrication, and the resultant glass coating is extremely effective for protection and passivation.

To the accomplishment of the above, and to such other objects as may hereinafter appear, the present invention relates to the composition of a glass particularly adapted to be used for the coating of semiconductor bodies, and to semiconductor bodies coated by such a glass, as defined in the appended claims and as described in this specification.

The glass composition of the present invention comprises relatively major proportions of zinc, boron and silicon, usually in the form of ZnO, $B_2O_3$ and $SiO_2$. This produces what may be more or less generically described as a zinc borosilicate glass. To this glass small amounts of lead and aluminum, also usually present in the form of oxides (PbO and $Al_2O_3$), are added. The proportions of these constituents must be relatively closely controlled within certain limits in order for all of the desired advantages of the glass composition to be achieved. These proportions are set forth below in Table I in terms of parts by weight of oxide (that being referred to hereinafter as the oxide-equivalent amount of the elements in question), it being understood that it is not absolutely essential that the elements be present in the form of oxides.

TABLE I

| Oxide: | Parts by weight |
| --- | --- |
| ZnO | 55–58 |
| $B_2O_3$ | 22–27 |
| $SiO_2$ | 6–13 |
| PbO | 2–4 |
| $Al_2O_3$ | 2–4 |

While the various components may be present within the ranges set forth above in Table I, there is set forth below in Table II an embodiment in which the preferred amounts and proportions of the active elements are set forth:

TABLE II

| Oxide: | Parts by weight |
| --- | --- |
| ZnO | 58 |
| $B_2O_3$ | 27 |
| $SiO_2$ | 8 |
| PbO | 2 |
| $Al_2O_3$ | 1.6 |

It is essential, as indicated above, that the glass in question be as alkali-free as possible, and hence there should be no lithium, sodium or potassium ions therein. As a practical matter, such ions may well be present as impurities in trace amounts, and when I speak of an alkali-free glass, or a glass which is essentially devoid of lithium, sodium or potassium, I mean a glass in which such substances are not present in any quantities greater than trace impurity quantities.

The glass of the present invention may contain other constituents so long as those other constituents do not violate the alkali-free requirement as set forth above. For example, it is permissible and, indeed, in many instances desirable that the glass include a small amount of antimony trioxide ($Sb_2O_3$), in amounts by weight between 0.5 and 2.0 parts per 100 parts of total glass composition, with the preferred amount being 1.6 parts per 100 parts of total composition. This antimony trioxide serves as a flux, and also helps to produce a bubble-free condition in the glass. Other known glass additives, such as bismuth trioxide, cerium oxide and calcium oxide, may be added in minor amounts for their known properties (generally to facilitate the melting and refining of the glass) without impairing the quality of the glass or its characteristics.

The silicon and boron constitute the basic glass components, producing a borosilicate glass. This general type of glass is known to have a temperature coefficient of expansion similar to that of a semiconductor material such as silicon. Moreover, this general type of glass is known to have a relatively low melting point, thus facilitating its manufacture and making it more adaptable for use in connection with semiconductor units, since such units are sometimes adversely affected by high temperatures, and as a result a glass which can be applied at a lower temperature is more desirable than one which must be applied at a more elevated temperature. The addition of substantial amounts of zinc to the borosilicate glass is very significant insofar as the present invention is concerned. The zinc primarily does two things, it is believed. First, it brings the temperature coefficient of expansion of the glass into very close agreement with that of the underlying silicon substrate. The resultant glass has such a coefficient between 42.1 and $43.8 \times 10^{-7}$ cm./cm.° C. within the temperature range of 0–300° C. This is very close to that of silicon. Moreover, the zinc produces a blocking effect within the glass network which serves to inhibit, if not completely to prevent, the migration of ions therethrough. This is of particular importance in preventing the migration of trace amounts of injurious ions such as alkali ions from the glass to the underlying semiconductor. The aluminum oxide, at least when present in the small proportions here set forth, also appear to produce some blocking of the mobility of ions within the glass. The aluminum also, in the small proportions here involved, appears to increase the fluidity of the glass, making it easier to manufacture and apply, it helps in bringing the temperature coefficient of the glass more closely into conformity with that of the underlying semiconductor, and it apparently greatly improves the electrical characteristic of the glass at high temperatures on the order of 175° C., making that glass more stable under a reverse blocking life test. It also improves insulating and dielectric properties and controls hardness. The lead adds fluidity to the glass and lowers the softening point of the glass. The use of lead in any proportions much greater than that here shown appear to have an adverse effect in that it increases ion mobility, perhaps by breaking up the glass network, and, indeed, when an excessive amount of lead is employed it would appear that the lead ions themselves become mobile and have an adverse effect of the underlying semiconductor body.

The method of formation of the glass of the present invention is in accordance with conventional glass-forming techniques. The constituent elements, usually in oxide form, are weighed out and ball-milled to obtain a homogeneous mixture. The ball-milling operation may be carried on for from 30 to 60 minutes. Thereafter the mixture is placed within an appropriate crucible, such as one made of alumina or platinum, and it is then melted, preferably in an oxidizing atmosphere at a temperature of 1150° C. plus or minus 10° C., the melt being mechanically stirred in order to obtain homogeneity. The initial melting and stirring may take a period of time on the order of 4 hours. At the end of that period of time the glass is very fluid, homogeneous, transparent and bubble-free. It is then quenched to obtain a frit, and the frit is then dried, milled, and sized.

The glass frit thus obtained is then applied to the semiconductor in any appropriate manner, such as by means of slurry deposition, centrifuging or sputtering. The glass as thus applied adheres well to the silicon substrate and to all of the portions thereof which may have been subjected to various treatments in order to form the substrate into a semiconductor device such as a transistor, diode or the like, the glass producing a homogeneous and substantially impervious coating which provides an excellent protecting and passivating effect to the semiconductor body to which it is adhered.

The security of the glass coating will not be adversely affected by changes in temperature, since its temperature coefficient of expansion is very closely the same as that of the underlying semiconductor body substrate. Its dielectric and resistivity values are excellent. Because of its composition there is very little ion mobility within the glass coating, and hence its adverse effect on the semiconductor body is greatly minimized. It is highly durable, and may be applied in a convenient fashion, and the temperature is sufficiently low so as not to adversely affect the semiconductor body.

While but a limited number of embodiments of the present invention have been here specifically disclosed, it will be apparent that variations may be made therein, all within the scope of the invention as defined in the appended claims.

I claim:

1. In combination, a semiconductor body having a surface, and, on said surface, an alkali-free glass coating layer consisting essentially of the following constituents in about the following proportions by weight:

| | |
|---|---|
| ZnO | 55–58 |
| $B_2O_3$ | 22–27 |
| $SiO_2$ | 6–13 |
| PbO | 2–4 |
| $Al_2O_3$ | 2–4 |

2. The semiconductor combination of claim 1, wherein said glass also includes $Sb_2O_3$ substantially in proportions by weight of 0.5–2.

3. The semiconductor combination of claim 1, wherein the constituents of said glass are present in proportions by weight as follows:

| | |
|---|---|
| ZnO | 58 |
| $B_2O_3$ | 27 |
| SiO | 8 |
| PbO | 3.4 |
| $Al_2O_3$ | 2 |

4. The semiconductor combination of claim 3, wherein said glass also includes $Sb_2O_3$ substantially in proportions by weight of 1.6.

5. In combination, a semiconductor body having a surface, and, on said surface, a coating layer consisting essentially of a zinc borosilicate glass essentially devoid of sodium, lithium and potassium and including lead and aluminum each present in oxide-equivalent amounts by weight of about 2–4 parts per 100 parts of the total glass composition.

6. The semiconductor combination of claim 5, wherein said glass also includes antimony present in oxide-equivalent amounts by weight of about 0.5–2 parts per 100 parts of the total glass composition.

7. The semiconductor combination of claim 6, wherein said glass includes said lead and aluminum present in oxide-equivalent amounts by weight of about 3.4 and 2 respectively relative to the total glass composition.

8. The semiconductor combination of claim 5, wherein said glass includes said lead and aluminum present in oxide-equivalent amounts by weight of about 3.4 and 2 respectively relative to the total glass composition.

References Cited

UNITED STATES PATENTS

| | | | |
|---|---|---|---|
| 3,551,171 | 12/1970 | Thomas | 106—52 |
| 3,493,405 | 3/1970 | Thomas | 106—53 |
| 3,535,133 | 10/1970 | Akhtar | 106—53 |
| 3,533,832 | 10/1970 | Volder | 117—201 |

OTHER REFERENCES

Parmelee et al.: The Glass Industry, pp. 235–238 and 258, November 1934.

ALFRED L. LEAVITT, Primary Examiner

M. F. ESPOSITO, Assistant Examiner

U.S. Cl. X.R.

106—53, 54